United States Patent [19]

Fajt

[11] 4,439,801
[45] Mar. 27, 1984

[54] ELECTRICAL LOAD IMBALANCE DETECTION AND PROTECTION APPARATUS

[75] Inventor: John Fajt, Wynnewood, Okla.

[73] Assignee: Xenell Corporation, Wynnewood, Okla.

[21] Appl. No.: 367,549

[22] Filed: Apr. 12, 1982

[51] Int. Cl.³ .............................................. H02H 3/20
[52] U.S. Cl. ........................................ 361/55; 361/56;
361/120; 219/212; 219/505; 313/306; 313/581;
315/91
[58] Field of Search ................... 361/56, 91, 110, 111,
361/112, 120, 129, 130, 39, 40, 55; 313/306,
325, 303, 581, 589; 315/91, 360, 119, 120;
219/212, 505

[56] References Cited

U.S. PATENT DOCUMENTS

| | | | |
|---|---|---|---|
| 1,886,180 | 11/1932 | Green | 313/581 X |
| 3,328,623 | 6/1967 | Hale et al. | 361/120 X |
| 3,466,504 | 9/1969 | Hart, Jr. | 361/19 |
| 4,354,217 | 10/1982 | Mahon | 361/55 X |

OTHER PUBLICATIONS

*Using and Understanding Miniature Neon Lamps* by William G. Miller, *General Electric Glow Lamp Manual,* (Second Edition).

Primary Examiner—Reinhard J. Eisenzopf
Attorney, Agent, or Firm—E. Harrison Gilbert, III

[57] ABSTRACT

The apparatus includes three electrodes housed in a single enclosure which is filled with a gas. A first one of the electrodes is connected to the junction of a load and a fuse. A second one of the electrodes is connected to an intermediate point of the load, which intermediate point separates the load into two normally equal impedance segments. A third one of the electrodes is connected to the other end of the load. When either of the impedances of the two segments of the load changes sufficiently to cause a breakdown voltage between either the first and second electrodes or between the second and third electrodes to be exceeded, current flows between the first and third electrode thereby short-circuiting the load and causing the fuse to break.

22 Claims, 2 Drawing Figures

ELECTRICAL LOAD IMBALANCE DETECTION AND PROTECTION APPARATUS

BACKGROUND OF THE INVENTION

This invention relates generally to an apparatus for detecting when an electrical load has a change in its impedance and for disconnecting the load from a power source to which it is connected when the change is sufficiently large. More particularly, but not by way of limitation, the invention relates to an apparatus for detecting a fault in an electric blanket heating element and for causing a fuse to open in response to the fault being detected so that the electric blanket heating element will be deactivated, thereby precluding the possibility of a fire resulting from the defective electric blanket heating element.

An electrical energy source is used to energize a device for the purpose of having the device perform some function. The device which is energized is referred to as an electrical load which is electrically quantifiable and identifiable as impedance. The impedance of the load is important because it determines the amount of energy which is drawn from the energy source to energize the load device. Because the impedance of the load can vary due to the utilization and aging of the device, it is important to monitor the load to determine when the impedance significantly changes so that the load can be disconnected from the energy source whereby neither the device is damaged nor a user of the device is injured through the continued use of the device which has become defective because of the changed impedance.

By way of an example, an electric blanket having a heating element constructed of an electrical conductor is a device which provides a load to the 120-$V_{ac}$ energy source provided by an ordinary home electrical outlet. Assuming that this common energy source provides a constant voltage, the impedance which the electrical conductor heating element has determines the amount of current flowing through the heating element of the electric blanket when the electrical conductor is connected to the electrical outlet. If the impedance of the electrical conductor were to decrease, such as by a short-circuit in the electrical conductor, a greater amount of current would flow therethrough. With the increased current flow, the heating element provided by the electrical conductor would get hotter. If the current were to increase sufficiently, the heating element could become so hot that a fire could be started in the electric blanket. On the other hand, if the impedance of the electrical conductor were to increase, such as by an open circuit formed along the electrical conductor, the outlet voltage would appear at the ends of the open circuit which would be hazardous if the user of the electric blanket were to simultaneously touch both ends of the open circuit. In between these extremes of a short-circuit or an opencircuit in the electrical conductor, the impedance could vary to the extent that the electric blanket would also be considered to be malfunctioning at such varied impedance. Because of the adverse effects which could result from an electrical device which is malfunctioning as a result of the changed impedance of the device, it is important both to detect changes in the impedance of a load which is connected to an energy source and to remove the load from such connection to the energy source when the impedance sufficiently changes.

With respect to the electrical load presented by an electric blanket, I am aware of one apparatus which has been used to detect an anomalous or abnormal impedance of the heating element of the blanket and, in response thereto, to disconnect the electric blanket from its energy source. This prior apparatus of which I am aware includes a first lamp connected in parallel with a portion of the electrical conductor heating element of the electric blanket and also includes a second lamp in parallel with a second portion of the electrical conductor heating element of the electric blanket. Each of these lamps is illuminated in correspondence with changes in the impedances of the respective portions of the electrical conductor. When sufficient current flows through either of the lamps because of the changed impedance, that particular lamp is illuminated. The illumination is detected by a photo-detector element forming another part of the prior apparatus of which I am aware. There is a respective photo-detector element for each lamp so that when either of the photo-detector elements receives light from its corresponding illuminated lamp, it generates an electrical signal which triggers a triac having its terminals connected in electrical parallel with the entire electrical conductor of the electric blanket. When the triac is triggered by a signal from one of the photo-detector elements, it short-circuits the electrical conductor of the electric blanket, thereby allowing a sufficiently large current to flow through the short-circuit so that a fuse in the electric blanket/energy source circuit opens and provides an open circuit.

Although this prior device can detect impedance imbalances in a load and cause the load to be disconnected from its energy source, there is the need for an improved apparatus requiring fewer discrete parts so that the improved apparatus can be more compactly packaged and costs less. Additionally, there is the need for such an improved apparatus to be constructed so that it is highly reliable, both mechanically and electrically, and so that it is not susceptible to being falsely triggered by circuit transients.

SUMMARY OF THE INVENTION

The present invention meets the aforementioned needs and overcomes shortcomings which exist in the prior apparatus by providing a novel and improved electrical load imbalance detection and protection apparatus. The apparatus includes relatively few parts which are compactly packaged in a single small housing. The apparatus is also less expensive than the prior apparatus of which I am aware. Due to its construction, the present invention exhibits a high degree of mechanical and electrical integrity and reliability and is not susceptible to being falsely triggered by transients.

Broadly, the present invention provides an apparatus for detecting an imbalance between impedances within an electrical load and for causing the electrical load to be disconnected from an energy source to which it is connected when the impedance imbalance is sufficiently large. More particularly, the invention includes an apparatus for establishing a short-circuit in electrically parallel connection with a load, which load has a first impedance segment defined between a first end of the load and an intermediate point of the load and further has a second impedance segment defined between a second end of the load and the intermediate point, when the load is connected to an energy source and has an impedance imbalance between the first impedance segment and the second impedance segment. In the preferred embodiment the present invention provides an apparatus for deactivating an electric blanket when a resistive heating element of the blanket presents an abnormal load to an energy source to which the resistive heating element, in series with a fuse, is connectible.

This apparatus broadly includes a first electrode having an end electrically connected to the first end of the load. The apparatus also includes a second electrode having an end electrically connected to the intermediate point of the load, and the apparatus further includes a third electrode having an end electrically connected to the second end of the load. The apparatus further comprises a housing having a hollow interior in which the first, second and third electrodes are disposed. A gas which is disposed in the hollow interior of the housing is also included in the apparatus. These elements are combined to form a glow lamp.

The electrodes are constructed so that a relatively large current can flow there among. This is achieved in the preferred embodiment by constructing each of the three electrodes to include an outer surface portion comprising barium and barium oxide and/or other suitable materials and compounds. The electrodes are further constructed so that there are predetermined breakdown voltage ratings between the first and second electrodes and between the second and third electrodes. When either of the predetermined breakdown voltage ratings is exceeded, the apparatus is triggered so that is becomes conductive between the first and third electrodes, thereby providing a short-circuit in electrical parallel with the load. This short-circuit causes a fuse disposed between the load and the energy source to open, thereby disconnecting the load from the energy source.

From the foregoing it is a general object of the present invention to provide a novel and improved electrical load imbalance detection and protection apparatus. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
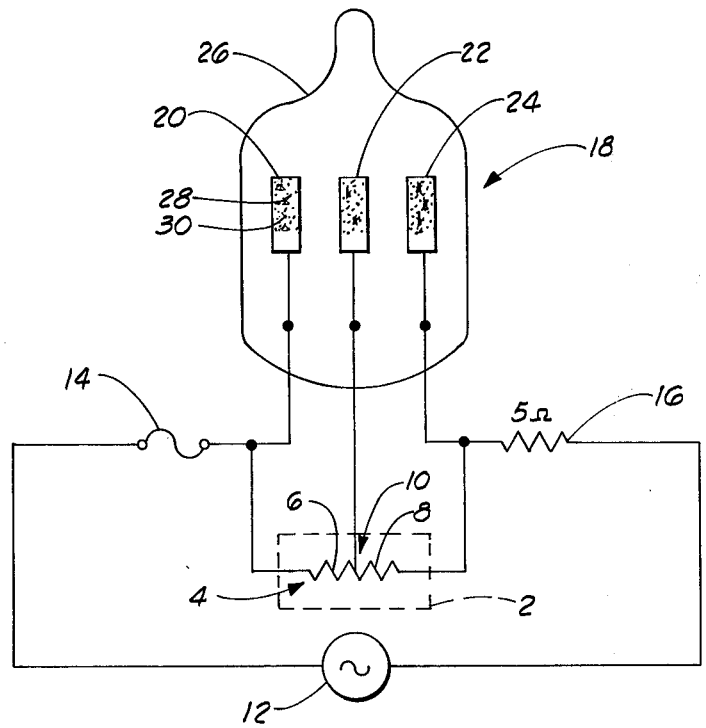
FIG. 1 is a schematic circuit diagram showing a first preferred embodiment of the present invention.
Figure 2:
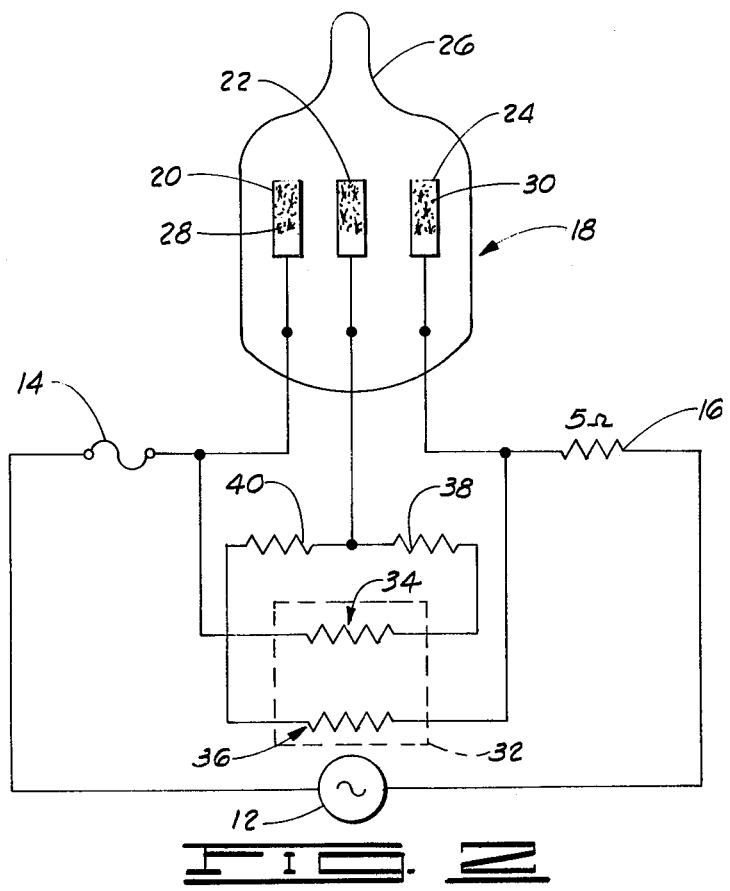
FIG. 2 is a schematic circuit diagram showing a second preferred embodiment of the present invention.

With reference to FIGS. 1 and 2 the preferred embodiments of the present invention will be described. In FIG. 1 a first preferred embodiment is disclosed with reference to an electric blanket 2 having a heating element represented by an impedance element symbolized as a resistor 4. Although the present invention is generally responsive to impedance variations which create different voltages, the drawings and the following description refer specifically to resistance and resistivity rather than impedance for purposes of simplicity. However, it is to be noted that such narrower description by reference to resistance rather than to impedance is not to be taken as limiting the scope of the present invention with respect to its applicability to impedance in general.

The resistor 4 has a first resistive segment 6 and a second resistive segment 8 connected at a central resistance (or impedance) locus 10 disposed intermediate a first end and a second end of the resistor 4. The resistor 4 is the heating element of the electric blanket 2, and this heating element is the primary load in the circuit which is shown in FIG. 1 and which is energized by a suitable energy source 12 which in the preferred embodiments is a constant a.c. voltage source such as is provided at a 120-$V_{ac}$ outlet in a house.

The first end of the resistor 4 is connected to a first end of the energy source 12 through a fuse 14 comprising a fusible element which breaks apart, or opens, when an overcurrent (i.e., a current in excess of the current-handling capability of the fusible element) flows therethrough. The second end of the resistor 4 is connected to a second end of the energy source 12 by suitable connector means which in the preferred embodiment shown in FIG. 1 includes a resistor 16. The resistor 16 is used in the circuit to prevent transient signals from blowing or breaking the fuse 14 when such transient signals cause the protective apparatus of the present invention to become momentarily current-conductive. This function of the resistor 16 is known to the art.

The present invention schematically illustrated in FIG. 1 includes a glow lamp 18 which has a first electrode 20, a second electrode 22, a third electrode 24 and a housing 26 having the three electrodes 20–24 disposed within a hollow interior of the housing 26. In the preferred embodiment the housing 26 is a suitable glass structure constructed as known to the art. Also forming a part of the glow lamp 18 is a gas also disposed within the hollow interior of the housing 26. In the preferred embodiment the gas comprises neon and krypton 85 as known to the art. Other suitable gases may be used.

The three electrodes 20–24 are disposed within the housing 26 in spaced relation to each other. The first electrode 20 is connected by suitable connector means to the first end of the resistor 4 as shown in FIG. 1. The second electrode 22 is connected by suitable connector means to the intermediate point 10, and the third electrode 24 is connected by suitable connector means to the second end of the resistor 4 as also shown in FIG. 1. The "suitable connector means" of the preferred embodiment includes electrical conductor leads of copper-coated iron and Dumet wires as known to the art.

Each of the electrodes 20–24 has an outer surface portion comprising both barium (identified in the figures by reference numeral 28) and barium oxide (identified in the figures by reference numeral 30). The barium on the electrodes provides a lower breakdown voltage between adjacent ones of the electrodes than would otherwise exist without the presence of the barium. The barium oxide enables the electrodes to conduct relatively large effective amounts of current, such as 10 amperes (rms). It is this combination of barium and barium oxide which permits the glow lamp 18 to adequately detect and respond to resistance variations in the resistive segments 6 and 8 and to subsequently conduct sufficiently high currents to cause the fuse 14 to provide an open circuit whereby the resistor (load) 4 is disconnected from the energy source 12. It is to be noted that in the preferred embodiment strontium and strontium oxide are also disposed on surface portions of the electrodes. Other suitable materials and compounds can also be used. For a more detailed description of the glow lamp 18, see my copending patent application, entitled A Low Breakdown Voltage, High Current Glow Lamp and Method of Manufacturing the Same, and filed of even date herewith, which is incorporated herein by reference.

When the electric blanket 2 has its heating element (the resistor 4) connected to the energy source 12 through the fuse 14, a current flows through the resistive segments 6 and 8 and thereby establishes a first voltage between the first electrode 20 and the second electrode 22 and establishes a second voltage between the second electrode 22 and the third electrode 24. When the resistances of the resistive segments 6 and 8 are equal, the voltages between the first electrode 20 and the second electrode 22 and between the second electrode 22 and the third electrode 24, respectively, are equal; however, when the resistances of the resistive segments 6 and 8 are unequal, the corresponding voltages are unequal. Specifically, the first voltage between the first electrode 20 and the second electrode 22 is greater than the second voltage between the second electrode 22 and the third electrode 24 when the resistance of the first resistive segment 6 is greater than the resistance of the second resistive segment 8. Conversely, the first voltage is less than the second voltage when the resistance of the first resistive segment 6 is less than the resistance of the second resistive segment 8.

As the ratio between the resistances of the segments 6 and 8 changes, the resistance which is relatively greater causes a greater voltage to be established between its associated set of electrodes. When this voltage exceeds a predetermined value, which "predetermined value" is the breakdown voltage of the electrodes as is known in the art, a current starts to flow between those two electrodes. This flow of current causes an arc or current conductive path to be established between the first electrode 20 and the third electrode 24. With this current path established between the electrodes 20 and 24, the glow lamp 18 effectively provides a short-circuit in electrical parallel with the heating element (resistor 4) of the electric blanket 2. This short-circuit permits a greater current to flow through the fuse 14 (assuming the voltage of the energy source 12 remains constant) and when this greater current has a sufficiently large effective magnitude, the fusible element of the fuse 14 breaks and establishes an open circuit which disconnects the heating element from the energy source 12. (The "sufficiently large effective magnitude" of current is that which constitutes an overcurrent, or current which exceeds the current-handling rating of the fuse).

Thus, the glow lamp 18 detects when the resistances of the resistive segments 6 and 8 change and causes the resistor 4 to be disconnected from the energy source 12. The causes for the changes in the resistances of the resistive elements 6 and 8 can be, for example, the electric blanket 2 becoming wet which would thereby reduce the resistance of that portion of the resistor 4 which also became wet. Alternatively, a portion of the resistor 4 might break and thus provide an open-circuit across which the voltage of the energy source 12 would appear.

With reference to FIG. 2 a second preferred embodiment of the present invention will be described. The FIG. 2 embodiment includes a different type of electric blanket as designated by the reference numeral 32. The electric blanket 32 includes two separate electrical conductors or resistive elements 34 and 36 constituting the heating elements of the electric blanket 32. The electric blanket 32 is connected into an energization circuit of the type shown in FIG. 1 as indicated by the elements having like reference numerals (i.e., the energy source 12, the fuse 14, and the resistor 16). The flow lamp 18 is also identical to the one shown in FIG. 1 as indicated by the like reference numerals.

The electrode 20 of the glow lamp 18 is connected in the second preferred embodiment shown in FIG. 2 to a first end of the electrical conductor 34. The first end of the electrical conductor 34 defines the first end of the overall resistive heating element which the first electrical conductor 34 and the second electrical conductor 36 provide. The first electrical conductor 34 can also be said to comprise a first resistive segment of the overall resistive heating element. The first end of the electrical conductor 34 is also that end which is electrically connected to the fuse 14.

The third electrode 24 is shown in the second preferred embodiment to be connected to a second end of the resistive heating element, which second end is defined by a first end of the second electrical conductor 36. The conductor 36 is also referred to as a second resistive segment of the overall resistive heating element of the electric blanket 32. The first end of the electrical conductor 36 (or, in other words, the second end of the resistive heating element of the electric blanket 32) is the end which will be referred to as opposite the first end of the resistive heating element and is connected by the connector means provided by the resistor 16 to the other terminal of the energy source 12.

The second electrode 22 is connected to the resistive heating element intermediate its first and second ends by suitable connector means. In the second preferred embodiment illustrated in FIG. 2 the intermediate locus of connection is defined as the respective second ends of the electrical conductors 34 and 36. The connector means connecting the second electrode 22 to the respective second ends includes a first resistor 38 having a first end electrically connected to the second electrode 22 and further having a second end electrically connected to the second end of the first electrical conductor 34. The connector means also includes a second resistor 40 having a first end electrically connected to the second electrode and to the first end of the first resistor 38 and further having a second end electrically connected to the second end of the second electrical conductor 36.

The resistors 38 and 40 connect to the electrical conductor 34 and the electrical conductor 36, respectively, at a locus or respective loci whereby the electrical conductor 34 normally has a resistance equal to the resistance of the second electrical conductor 36. Likewise, the resistors 38 and 40 normally have equal resistances so that the glow lamp 18 will detect a balanced load under normal circumstances. The resistors 38 and 40 have any suitable values, such as between 5,000 and 50,000 ohms. It is to be noted that the resistors 38 and 40 can be deleted without adversely affecting the operation of the present invention; however, they are shown in the preferred embodiment so that current flow is limited into the coupled electrical conductors 34 and 36 of the electric blanket 32.

The second preferred embodiment schematically illustrated in FIG. 2 operates similarly to the embodiment illustrated in FIG. 1. In particular, the electrodes 20, 22 and 24 are constructed to pass an electrical current having a magnitude large enough to cause the fuse 14 to provide an open circuit when a sufficient anomaly or abnormality in the resistances of the electrical conductors 34 and 36 is detected. This construction includes providing each of the electrodes with a surface portion comprising barium and barium oxide and/or other suitable materials and compounds (such as strontium and strontium oxide). More particularly, the glow lamp 18 becomes electrically conductive and passes current between the first electrode 20 and the third electrode 24 when the resistance of the first electrical conductor 34 is sufficiently different from the resistance of the second electrical conductor 36 that a voltage having an effective magnitude greater than a predetermined breakdown voltage value is applied either between the first electrode 20 and the second electrode 22 or between the second electrode 22 and the third electrode 24. In this event of current flow between the first and third electrodes 20 and 24, the fuse 14 provides an open circuit when the current passing between the first and third electrodes 20 and 24 has an effective magnitude greater than a predetermined current value, which predetermined current value is the current at which the fusible element of the fuse 14 will break. Once the fuse 14 provides the open circuit, the electrical conductors 34 and 36 of the electric blanket 32 are deactivated, thereby preventing a fire or other hazardous situation arising from the faulty heating element of the electric blanket.

Although the foregoing has particularly described the invention as detecting changes in the resistance (or impedance) of one segment relative to another segment, the present invention can also detect and properly operate when both segments change resistance (or impedance) identically [i.e., the imbalance is relative to each segement's former or normal resistance (for impedance)] so long as the change is sufficient to cause a voltage in excess of the breakdown voltage rating to be applied to the electrodes.

Therefore, the present invention specifically provides an apparatus for detecting an abnormal load and for conducting a current which causes a fuse to open, thereby disconnecting the load from its energy source. More broadly, the present invention is capable of detecting impedance changes in a load and of conducting a current and thereby short-circuiting the load when the impedance changes sufficiently that a voltage responsive to the impedance change exceeds a predetermined breakdown voltage. Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for providing a short-circuit in electrically parallel connection with a load, the load having a first impedance segment defined between a first end of the load and an intermediate point of the load and further having a second impedance segment defined between a second end of the load and the intermediate point, when the load is connected to an energy source and has a sufficient impedance change in either the first impedance segment or the second impedance segment, said apparatus comprising:
   a first electrode having an end electrically connectible to the first end of the load;
   a second electrode, spaced from said first electrode, having an end electrically connectible to the intermediate point of the load so that said first and second electrodes have a first voltage established therebetween when a current flows through the first impedance segment and said first and second electrodes are connected to the first impedance segment, said first voltage being responsive to the impedance of the first impedance segment;
   a third electrode, spaced from said first and second electrodes, having an end electrically connectible to the second end of the load so that said second and third electrodes have a second voltage established therebetween when a current flows through the second impedance segment and said second and third electrodes are connected to the second impedance segment, said second voltage being responsive to the impedance of the second impedance segment;
   a housing having a hollow interior in which said first, second and third electrodes are disposed; and
   wherein a current flows between said first and third electrodes when either said first voltage or said second voltage exceeds a predetermined value.

2. An apparatus as defined in claim 1, wherein each of said first, second and third electrode has an outer surface on which barium and barium oxide are disposed.

3. An apparatus for providing a short-circuit in electrically parallel connection with a load, the load having a first resistive segment defined between a first end of the load and an intermediate point of the load and further having a second resistive segment defined between a second end of the load and the intermediate point, when the load is connected to an energy source and has a sufficient resistive change in either the first resistive segment or the second resistive segment, said apparatus comprising:
   a first electrode having an end electrically connectible to the first end of the load;
   a second electrode, spaced from said first electrode, having an end electrically connectible to the intermediate point of the load, said first and second electrodes having a predetermined breakdown voltage;
   a third electrode, spaced from said first and second electrodes, having an end electrically connectible to the second end of the load, said second and third electrodes having a predetermined breakdown voltage;
   a housing having a hollow interior in which said first, second and third electrodes are disposed; and
   wherein a current flows between said first and third electrodes to provide the short-circuit in electrically parallel connection with the load when said electrodes are connected to the load and either the breakdown voltage of said first and second electrodes or the breakdown voltage of said second and third electrodes is exceeded by a voltage established by a current flowing through the first resistive segment or the second resistive segment.

4. An apparatus as defined in claim 3, further comprising a gas disposed in said hollow interior of said housing.

5. An apparatus as defined in claim 3, wherein each of said first, second and third electrodes has an outer surface on which barium and barium oxide are disposed.

6. An apparatus as defined in claim 3, wherein:
   said first and second electrodes have a first voltage established therebetween when said first and second electrodes are connected to the load and a current from the energy source flows through the first resistive segment;

said second and third electrodes have a second voltage established therebetween when said second and third electrodes are connected to the load and a current from the energy source flows through the second resistive segment;

said first and second voltages are equal when said first and second resistive segments have equal resistances; and said first and second voltages are unequal when said first and second resistive segments have unequal resistances.

7. An apparatus as defined in claim 6, wherein:

said first voltage is greater than said second voltage when the resistance of the first resistive segment is greater than the resistance of the second resistive segment; and said first voltage is less than said second voltage when the resistance of the first resistive segment is less than the resistance of the second resistive segment.

8. An apparatus as defined in claim 6, wherein each of said first, second and third electrodes has an outer surface on which barium and barium oxide are disposed.

9. An apparatus as defined in claim 8, further comprising a gas disposed in said hollow interior of said housing.

10. An apparatus for deactivating an electric blanket when a resistive heating element of the electric blanket presents an abnormal load to an energy source to which the resistive heating element, in series with a fuse, is connectible, said apparatus comprising:

a glow lamp including a first electrode, a second electrode, and a third electrode;

first connector means for electrically connecting said first electrode to a first end of the resistive heating element, said first end being the end which is electrically connected in series to the fuse;

second connector means for electrically connecting said third electrode to a second end of the resistive heating element opposite said first end thereof; and third connector means for electrically connecting said second electrode to the resistive heating element intermediate said first and second ends thereof, said intermediate connection dividing the resistive heating element into a first resistive segment and a second resistive segment so that said first resistive segment normally has a resistance equal to a resistance of said second resistive segment.

11. An apparatus as defined in claim 10, wherein said third connector means includes a resistor.

12. An apparatus as defined in claim 10, wherein:

said resistive heating element includes:

a first electrical conductor defining said first resistive segment and having a first end defining said first end of said resistive heating element and further having a second end; and a second electrical conductor defining said second resistive segment and having a first end defining said second end of said resistive heating element and further having a second end; and said third connector means includes:

a first resistor having a first end electrically connected to said second electrode and further having a second end electrically connected to said second end of said first electrical conductor; and a second resistor having a first end electrically connected to said second electrode and said first end of said first resistor and further having a second end electrically connected to said second end of said second electrical conductor.

13. An apparatus as defined in claim 10, wherein each of said first, second and third electrodes is constructed to pass an electrical current having a magnitude large enough to cause the fuse to provide an open circuit.

14. An apparatus as defined in claim 13, wherein each of said first, second and third electrodes includes a surface portion comprising barium and barium oxide.

15. An apparatus as defined in claim 10, wherein each of said first, second and third electrodes includes a surface portion comprising barium and barium oxide.

16. An apparatus as defined in claim 15, wherein said third connector means includes a resistor.

17. An apparatus as defined in claim 15, wherein:

said resistive heating element includes:

a first electrical conductor defining said first resistive segment and having a first end defining said first end of said resistive heating element and further having a second end; and a second electrical conductor defining said second resistive segment and having a first end defining said second end of said resistive heating element and further having a second end; and said third connector means includes:

a first resistor having a first end electrically connected to said second electrode and further having a second end electrically connected to said second end of said first electrical conductor; and a second resistor having a first end electrically connected to said second electrode and said first end of said first resistor and further having a second end electrically connected to said second end of said second electrical conductor.

18. An apparatus as defined in claim 10, wherein said glow lamp becomes electrically conductive and passes current between said first and third electrodes when the resistance of said first resistive segment is sufficiently different from the resistance of said second resistive segment so that a voltage having an effective magnitude greater than a predetermined voltage value is applied either between said first and second electrodes or between said second and third electrodes.

19. An apparatus as defined in claim 18, wherein the fuse provides an open circuit, thereby deactivating the electric blanket, when said current passing between said first and third electrodes has an effective magnitude greater than a predetermined current value.

20. An apparatus for preventing a primary impedance load from conducting too much current when the primary impedance load is connected to an energy source, said apparatus comprising:

a fuse having a first end connected to a first end of the primary impedance load and having a second end connectible to a first end of the energy source;

connector means for connecting a second end of the primary impedance load to a second end of the energy source; and a glow lamp including:

a first electrode connected to said first end of the primary impedance load;

a second electrode connected to said primary impedance load at a central impedance locus thereof, said central impedance locus dividing said primary impedance load into two segments normally having equal impedances;

a third electrode connected to said second end of the primary impedance load; and wherein a first one of said two segments of the primary impedance load establishes a first voltage between said first and second electrodes when a current flows through the primary impedance load and a second one of said two segments of the primary impedance load establishes a second voltage between said second and third electrodes when a current flows through the primary impedance load and further wherein a short-circuit current flows between said first and third electrodes when either said first voltage or said second voltage exceeds a predetermined value.

21. An apparatus as defined in claim 20, wherein said connector means includes a resistor disposed between said second end of the primary impedance load and said second end of the energy source.

22. A method of detecting an abnormal electrical load and of providing an electrical short-circuit in electrical parallel to the abnormal electrical load, comprising:

connecting a first electrode of a three-electrode glow lamp to a first end of the electrical load;

connecting a second electrode of said glow lamp to an intermediate locus of the electrical load so that a first voltage is established between said first and second electrodes when a current flows through the electrical load, said first voltage being proportional to the impedance of the portion of the electrical load between said first end and said intermediate locus thereof; and connecting a third electrode of said glow lamp to a second end of the electrical load so that a second voltage is established between said second and third electrodes when a current flows through the electrical load, said second voltage being proportional to the impedance of the portion of the electrical load between said intermediate locus and said second end thereof, wherein the electrical short-circuit is provided between said first and third electrodes when either said first voltage or said second voltage exceeds a predetermined value.

* * * * *

UNITED STATES PATENT AND TRADEMARK OFFICE
CERTIFICATE OF CORRECTION

PATENT NO. : 4,439,801

DATED : March 27, 1984

INVENTOR(S) : John Fajt

It is certified that error appears in the above-identified patent and that said Letters Patent are hereby corrected as shown below:

Column 1, line 60, delete "opencircuit" and insert --open-circuit--.

Column 3, line 30, delete "that is" and insert --that it--.

Column 6, line 2, delete "flow" and insert --glow--.

Column 7, line 31, delete "(for" and insert --(or--.

Column 8, line 23 (claim 2, line 2), delete "electrode" and insert --electrodes--.

Signed and Sealed this

Twelfth Day of June 1984

[SEAL]

Attest:

Attesting Officer

GERALD J. MOSSINGHOFF

Commissioner of Patents and Trademarks